US008661262B2

(12) United States Patent
Uchida

(10) Patent No.: US 8,661,262 B2
(45) Date of Patent: Feb. 25, 2014

(54) USER AUTHENTICATION SYSTEM, TERMINAL USED IN THE SAME, AUTHENTICATION VERIFICATION DEVICE, AND PROGRAM

(75) Inventor: Kaoru Uchida, Tokyo (JP)

(73) Assignee: NEC Corporation, Tokyo (JP)

( * ) Notice: Subject to any disclaimer, the term of this patent is extended or adjusted under 35 U.S.C. 154(b) by 1460 days.

(21) Appl. No.: 11/990,268

(22) PCT Filed: Aug. 16, 2006

(86) PCT No.: PCT/JP2006/316102
§ 371 (c)(1),
(2), (4) Date: Feb. 11, 2008

(87) PCT Pub. No.: WO2007/020942
PCT Pub. Date: Feb. 22, 2007

(65) Prior Publication Data
US 2009/0282466 A1    Nov. 12, 2009

(30) Foreign Application Priority Data
Aug. 18, 2005    (JP) ................................. 2005-237499

(51) Int. Cl.
*G06F 21/00*    (2013.01)

(52) U.S. Cl.
USPC .............. 713/186; 713/176; 713/182; 726/5; 726/6; 726/7

(58) Field of Classification Search
USPC ........................... 713/186, 176, 182; 726/5–7
See application file for complete search history.

(56) References Cited

U.S. PATENT DOCUMENTS

| | | | | |
|---|---|---|---|---|
| 5,481,720 A | * | 1/1996 | Loucks et al. .................. | 726/21 |
| 5,706,427 A | * | 1/1998 | Tabuki .............................. | 726/5 |
| 5,841,970 A | * | 11/1998 | Tabuki .............................. | 726/2 |
| 6,332,193 B1 | * | 12/2001 | Glass et al. .................... | 713/170 |
| 2001/0027520 A1 | * | 10/2001 | Mori .............................. | 713/186 |
| 2002/0152375 A1 | * | 10/2002 | Shigematsu et al. .......... | 713/155 |
| 2004/0034783 A1 | * | 2/2004 | Fedronic et al. ............. | 713/186 |
| 2006/0005025 A1 | * | 1/2006 | Okada et al. .................. | 713/168 |

FOREIGN PATENT DOCUMENTS

| | | |
|---|---|---|
| JP | 2002-33823 | 1/2002 |
| JP | 2003-44436 | 2/2003 |
| JP | 2004-54633 | 2/2004 |
| JP | 2004-185255 | 7/2004 |
| JP | 2004-348308 | 12/2004 |
| JP | 2005-10826 | 1/2005 |

* cited by examiner

*Primary Examiner* — Carl Colin
*Assistant Examiner* — Mohammad A Siddiqi
(74) *Attorney, Agent, or Firm* — McGinn International Property Law Group, PLLC

(57) ABSTRACT

A user authentication system includes a profile generation unit at the side of a user terminal, and a profile storage unit and a confirmation/replication verification unit at the side of an authentication verification device. When authentication processing is executed in the user terminal, the profile generation unit aggregates input biometric information, registered biometric information, and information which duplicates collation processing contents, and sets a profile being an aggregation of data. The profile storage unit stores the profile at the outside of the user terminal with identification information of authentication processing. The confirmation/replication verification unit confirms the stored contents, and replicates collation processing. Accordingly, when verification is necessary, the validity of authentication processing in the user terminal is verified, and a service provider device is notified of this. Accordingly, there is provided a system which can verify the validity of the authentication processing performed in the user terminal.

12 Claims, 14 Drawing Sheets

AT THE TIME OF REQUESTING SERVICE (SERVICE PROVIDER DEVICE SIDE)

FIG.5   S12

| ■PROFILE | |
|---|---|
| PROCESSING EXECUTION TERMINAL ID | 153-682-2451565 |
| IDENTIFICATION PROCESSING ID | 324654 |
| EXECUTION TIME STAMP | 16:34:32,07/26/2005 |
| PROCESSING PROGRAM MANAGEMENT ORGANIZATION ID | 231 |
| REGISTERED FEATURE EXTRACTION PROCESSING ID | 8269 |
| INPUT FEATURE EXTRACTION PROCESSING ID | 8269 |
| FEATURE COLLATION PROCESSING ID | 8288 |
| FEATURE COLLATION PROCESSING EXECUTION THRESHOLD VALUE | 1200 |
| ····(OTHER EXECUTION PARAMETERS) | |
| REGISTERED BIOMETRIC INFORMATION SIZE (BYTE) | 180000 |
| INPUT BIOMETRIC INFORMATION SIZE (BYTE) | 90000 |
| REGISTERED BIOMETRIC INFORMATION | REAL DATA |
| INPUT BIOMETRIC INFORMATION | REAL DATA |

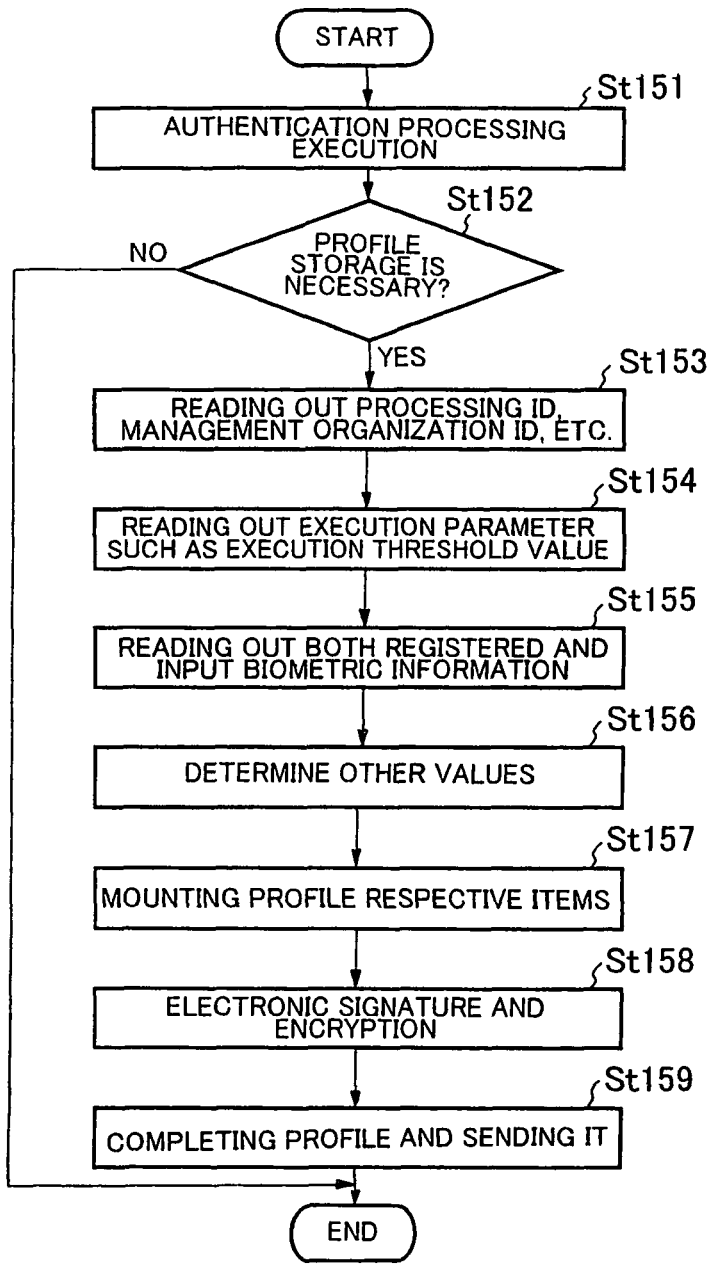

AT THE TIME OF REQUESTING SERVICE
(AUTHENTICATION VERIFICATION DEVICE SIDE)

AT THE TIME OF VERIFICATION
(SERVICE PROVIDER DEVICE SIDE)

AT THE TIME OF VERIFICATION
(AUTHENTICATION VERIFICATION DEVICE SIDE)

AT THE TIME OF REQUESTING SERVICE
(USER TERMINAL SIDE)

AT THE TIME OF REQUESTING SERVICE
(SERVICE PROVIDER DEVICE SIDE)

AT THE TIME OF VERIFICATION
(SERVICE PROVIDER DEVICE SIDE)

AT THE TIME OF VERIFICATION
(AUTHENTICATION VERIFICATION DEVICE SIDE)

USER AUTHENTICATION SYSTEM, TERMINAL USED IN THE SAME, AUTHENTICATION VERIFICATION DEVICE, AND PROGRAM

TECHNICAL FIELD

The present invention relates to a user authentication system that confirms the identity through a network, a terminal used in the same, an authentication verification device, and a program, and more particularly, to a method and a system under which collation using biometric information (biometrics) peculiar to an individual such as a fingerprint is performed in a terminal near the user, and the collation result received through a network is used in a service provider device.

BACKGROUND ART

An example of the conventional user authentication method and system is disclosed in Patent document 1. As shown in FIG. 17, the conventional user authentication system includes a user terminal 110 (portable communication device) having a sensor (image sensor) 111 that is a biometric information input means, a registered biometric information database (DB) 112 that stores registered biometric information, and a collation unit 113 that compares two pieces of biometric information, and a service provider device 120 (central processing unit) that communicates with the user terminal 110 through the Internet and deals a financial transaction and the like based on the determination of a service provision possibility determination unit 121.

The conventional user authentication system provided with this configuration is operated as follows. That is a user who is to receive a service makes a sensor read in biometric information, and the biometric information thus read in is compared with registered biometric information which has been stored in the previously registered biometric information database (DB) 112 in the collation unit 113, and the authentication result is sent to the service provider device 120 through the Internet. When it is determined that the two pieces of biometric information accord with each other by the comparison authentication, the service provider device receives information that the authentication is ended from the user terminal 110, and the service provision possibility determination unit 121 of the service provider determines whether or not a service is provided. Patent Document 1: JP-A 2002-033823

DISCLOSURE OF THE INVENTION

Problems to be Solved by the Invention

The problem in this case is that the service provider side which determines whether or not a service is provided utilizing the authentication result by the biometric information in the user terminal can know only whether or not the collation result is accord, and cannot verify the validity of the result. The reason is that information other than accord or disaccord as the collation result cannot be utilized. Especially, in case the system of the service provider side and the user terminal are provided from different venders, and the system of the service provider side does not have a knowledge related to the details of realizing processing in the user terminal, and, furthermore, in case there is a possibility that an operation which is assumed from the beginning is not performed since a processing program of the user terminal is changed with evil intent, when the validity of the collation processing can not be confirmed, there is raised a big problem.

As a specific example, it is considered that the service provider is a banking establishment, and the service provider device 120 developed by a vender A and the user terminal 110 developed by another vender B are connected to establish and operate a system. Moreover, a case is considered, in which, when the user of the user terminal 110 requests transfer processing to the service provider using the mechanism of the authentication, in the authentication processing in the user terminal 110, it is determined that the degree of accord between the input biometric information and the registered biometric information is high, and the service provider device 120 is notified that the authentication processing is successful and transfer processing is performed, and afterward, the user insists that the person who requested the transfer processing is not the user, and anyone else spoofed and made the authentication processing successful, bringing about a conflict. In this case, since the vender of the service provider and the service provider device 120 cannot confirm and verify the authentication processing in the user terminal, there is raised a problem that the validity of the transfer processing cannot be proved.

In order to prevent the problem from occurring, conventionally, when configuring a service system, only a user terminal in which it is confirmed that technical details in the mounting and authentication accuracy realized by its authentication unit are of high levels or more in advance is connected to be used. The user terminal used here is necessarily restricted to a terminal of the same vender. Accordingly, the point that only the user terminal, that is, for example, the user who has a cellular phone terminal of a vender can be connected to the system to receive a service comes to be a restriction on the user spread, which raises a problem of preventing the diffusion of a service.

It is therefore an object of the present invention to provide a system which can verify the validity of the authentication processing performed in a user terminal when the service provider side needs the validity.

Means for Solving the Problems

According to the present invention, the above object can be attained by providing a user authentication system including a terminal which inputs biometric information to request a service provision with respect to a service provider device and performs biometric information collation between the input biometric information and registered biometric information which has been previously registered, and transmits the collation result to the service provider device, characterized by including: a data aggregate means for aggregating, as information necessary to verify the collation processing contents of the biometric information collation performed in the terminal, the input biometric information, the registered biometric information, and information which can duplicate the collation processing contents, as an aggregation of data; a data storage means for storing the aggregation of data; and a verification means for verifying the collation processing contents of the terminal by executing and duplicating the collation processing of the biometric information collation using the aggregation of data.

According to the user authentication system of the present invention, the data aggregate means may include means for, as the aggregation of data, setting collation data of the input biometric information and registered biometric information used in the collation processing, an identifier which specifies a code of a collation processing program used in the collation processing or the collation processing program, and information to duplicate an execution environment of the collation processing, to a data group, the data storage means may include means for storing the data group, and the verification means may include means for reading out the data group stored in the storage means and duplicating the collation processing of the biometric information collation to confirm the result.

The user authentication system of the present invention may further include: encryption means that encrypts the data group such that the encrypted data group can be decrypted in only the device in which the verification is performed.

According to the user authentication system of the present invention, the data aggregate means may be arranged in the terminal, the verification means may be arranged in an authentication verification device which is communicably connected to the terminal, and the data storage means may be arranged in the authentication verification device.

According to the user authentication system of the present invention, the data aggregate means may be arranged in the terminal, the verification means may be arranged in an authentication verification device which is communicably connected to the terminal, and the data storage means may be arranged in the service provider device.

According to the user authentication system of the present invention, the data aggregate means may be arranged in the terminal, the verification means may be arranged in an authentication verification device which is communicably connected to the terminal, and the data storage means may be arranged in the terminal.

According to the user authentication system of the present invention, the service provider device may include means for, based on the verification result by the verification means, determining the possibility of service provision to the terminal.

Furthermore, according to the present invention, there is provided a terminal which inputs biometric information to request a service provision with respect to a service provider device and performs biometric information collation between the input biometric information and registered biometric information which has been previously registered, and transmits the collation result to the service provider device, characterized by including: a data aggregate means for aggregating, as information necessary to verify the collation processing contents of the biometric information collation performed in the terminal, the input biometric information, the registered biometric information, and information which can duplicate the collation processing contents, as an aggregation of data.

According to the terminal of the present invention, the data aggregate means may include means for, as the aggregation of data, setting collation data of the input biometric information and registered biometric information used in the collation processing, an identifier which specifies a code of a collation processing program used in the collation processing or the collation processing program, and information to duplicate an execution environment of the collation processing, to a data group.

The terminal of the present invention may further include: means for storing the data group therein.

The terminal of the present invention may further include: means for transmitting the data group to the outside.

Furthermore, according to the present invention, there is provided an authentication verification device that is communicably connected to a terminal which inputs biometric information to request a service provision with respect to a service provider device and performs biometric information collation between the input biometric information and registered biometric information which has been previously registered, and transmits the collation result to the service provider device, characterized by including: reception means for receiving an aggregation of data which is configured by aggregating, as information necessary to verify the collation processing contents of the biometric information collation performed in the terminal, the input biometric information, the registered biometric information, and information which can duplicate the collation processing contents; and verification means for verifying the collation processing contents of the terminal by executing and duplicating the collation processing of the biometric information collation using the aggregation of data.

According to the authentication verification device of the present invention, the reception means may include means for, as the aggregation of data, receiving a data group having collation data of the input biometric information and registered biometric information used in the collation processing, an identifier which specifies a code of a collation processing program used in the collation processing or the collation processing program, and information to duplicate an execution environment of the collation processing, and the verification means may include verification means for executing and duplicating the collation processing of the biometric information collation using the data group to confirm the result.

According to the authentication verification device of the present invention, the verification means may include means for comparing the result of the executed collation processing and the result of the collation processing performed in the terminal.

The authentication verification device of the present invention may further include: means for transmitting the verification result by the verification means to the service provider device.

Furthermore, according to the present invention, there is provided a user authentication method which is used in a system including a terminal which inputs biometric information to request a service provision with respect to a service provider device and performs biometric information collation between the input biometric information and registered biometric information which has been previously registered, and transmits the collation result to the service provider device, characterized by including: a data aggregate step of aggregating, as information necessary to verify the collation processing contents of the biometric information collation performed in the terminal, the input biometric information, the registered biometric information, and information which can duplicate the collation processing contents, as an aggregation of data; a data storage step of storing the aggregation of data; and a verification step of verifying the collation processing contents of the terminal by executing and duplicating the collation processing of the biometric information collation using the aggregation of data.

According to the user authentication method of the present invention, the data aggregate step may include a step of, as the aggregation of data, setting collation data of the input biometric information and registered biometric information used in the collation processing, an identifier which specifies a code of a collation processing program used in the collation processing or the collation processing program, and information to duplicate an execution environment of the collation processing, to a data group, the data storage step may include a step of storing the data group, and the verification step may include a step of reading out the stored data group and duplicating the collation processing of the biometric information collation to confirm the result.

Furthermore, according to the present invention, there is provided a program which is used in a system including a terminal which inputs biometric information to request a service provision with respect to a service provider device and performs biometric information collation between the input biometric information and registered biometric information which has been previously registered, and transmits the collation result to the service provider device, characterized by causing a computer to execute: a data aggregate step of aggregating, as information necessary to verify the collation processing contents of the biometric information collation performed in the terminal, the input biometric information, the registered biometric information, and information which can duplicate the collation processing contents, as an aggregation of data; a data storage step of storing the aggregation of data; and a verification step of verifying the collation processing contents of the terminal by executing and duplicating the collation processing of the biometric information collation using the aggregation of data.

According to the program of the present invention, the data aggregate step may include a step of, as the aggregation of data, setting collation data of the input biometric information and registered biometric information used in the collation processing, an identifier which specifies a code of a collation processing program used in the collation processing or the collation processing program, and information to duplicate an execution environment of the collation processing, to a data group, the data storage step may include a step of storing the data group, and the verification step may include a step of reading out the stored data group and duplicating the collation processing of the biometric information collation to confirm the result.

Advantages of the Invention

According to the present invention, the input biometric information, the registered biometric information, and information which can duplicate the collation processing contents are aggregated to be stored, and, when the verification is necessary, by replicating the collation processing using the information, the validity of the authentication processing can be verified. Accordingly, the validity of the authentication processing performed in the user terminal can be verified when the service provider side needs the validity, and the service provider can utilize the result.

BRIEF DESCRIPTION OF THE DRAWINGS

FIG. 5 shows a specific example of a profile;

FIG. 6 shows a flowchart indicative of the details of the profile generation;

EXPLANATION OF REFERENCE SYMBOLS

Figure 1:
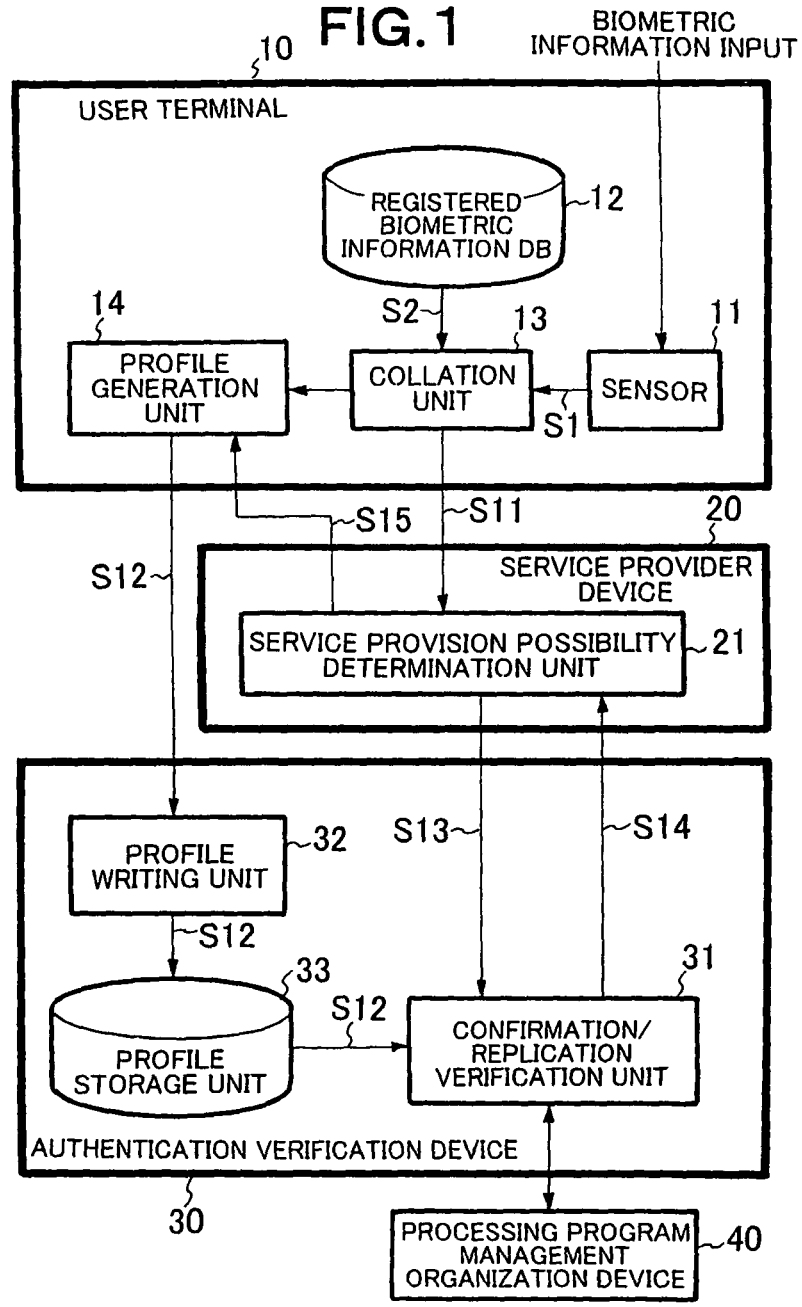
FIG. 1 shows a block diagram indicative of the entire configuration of the user authentication system of the first exemplary embodiment according to the present invention.

10: User terminal
11: Sensor
12: Registered biometric information database
13: Collation unit
14: Profile generation unit
15: VSP encryption unit
20: Service provider device
21: Service provision possibility determination unit
22: Temporary retention unit
30: Authentication verification device
31: Confirmation/replication verification unit
32: Profile writing unit
33: Profile storage unit
34: Decryption unit
35: Verification database
40: Processing program management organization device

BEST MODE FOR CARRYING OUT THE INVENTION

Hereinafter, the best mode to implement the user authentication system, terminal used in the same, authentication verification device, and program according to the present invention will be described in detail with reference to the accompanying drawings.

First Exemplary Embodiment

FIG. 1 shows a block diagram indicative of the configuration of the first exemplary embodiment according to the present invention.

Referring to FIG. 1, the user authentication system in this exemplary embodiment includes a user terminal 10 which is owned and held by the user who utilizes a service provided from a service provider (for example, banking establishment, electronic commerce provider, etc.), a service provider device 20 which is arranged on the service provider side which provides a service, and an authentication verification device 30. These three elements 10, 20 and 30 may be directly connected, or may be virtually connected through a network such as the Internet. The authentication verification device 30 is communicably connected to a processing program management organization device 40 which is arranged at the outside, and can obtain a processing program to be used in the authentication processing in the user terminal 10.

The user terminal 10 includes a computer device (including CPU (Central Processing Unit), memory, various input and output devices) having a communication means such as a cellular phone or a personal computer used by the user, and is provided with a sensor 11 as a biometric information input device which takes in biometric information such as a fingerprint or a face of the user and digitalizes biometric information thus taken in. The sensor 11 is arbitrarily selected according to the biometric information used to confirm the identity.

For example, when a fingerprint is used as the biometric information, a fingerprint sensor which can read in the pattern of a fingerprint of the user is employed as the sensor 11. As the fingerprint sensor, for example, there are known a capacitance type semiconductor sensor which reads in the pattern of a fingerprint by measuring a capacitance utilizing the difference of potential generated at the concavities and convexities of a finger, an optical sensor which utilizes the reflection of light and reads in the pattern of a fingerprint by converting the quantity of a reflected light amount to an electric signal, and a sensor of intra-finger scattered light direct read-in system which reads in the pattern of a fingerprint by irradiating light to a finger, and reading in light scattered in the inside of the finger, and any sensor of them may be employed in this exemplary embodiment.

On the other hand, when the face is used as the biometric information, an image sensor which is represented by a solid-state image pickup device which can pick up an image of the face of the user is employed as the sensor 11. For example, as an image sensor, there are known an image pickup device using a solid-state image sensing device of the CCD (Charged Couple Device) transfer type configuration, and an image pickup device using a solid-state image sensing device of the X-Y address type configuration, and any type of them may be employed in this exemplary embodiment.

In this exemplary embodiment, an example in which one sensor is used is shown, to which the present invention is not necessarily restricted, and there may be employed a configuration in which plural sensors are used, or a fingerprint sensor and an image sensor are combined.

Furthermore, functionally, the user terminal 10 includes a registered biometric information database (DB) (registered biometric information storage unit) 12, a collation unit 13, and a profile generation unit 14. Of these, the profile generation unit 14 configures a data aggregate means of the present invention.

The registered biometric information database 12 has stored biometric information of the qualified user input to the inside of the user terminal 10 from the sensor 11 in advance as digital data (also referred to as template data) configuring registered biometric information S2 of a predetermined internal format.

The collation unit 13 is realized when the CPU of the computer device configuring the user terminal 10 executes a program code of software for collation processing and determination processing which has been preset. The collation unit 13 performs the collation processing by evaluating whether or not the degree of similarity between input biometric information S1 input to the inside of the user terminal 10 from the sensor 11 when the authentication of the user is necessary and the registered biometric information S2 stored in the registered biometric information database 12 is equal to a threshold value preset or more, and a collation result (authentication processing result) S11 is sent to the service provider device 20 as an output signal of a preset form.

The profile generation unit 14 is realized when the CPU of the computer device configuring the user terminal 10 executes a program code of software for profile generation processing which has been preset. The profile generation unit 14 generates a profile S12 of the authentication processing when the authentication processing is executed, and outputs the profile S12 to the authentication verification device 30 as an output signal of a predetermined form.

The profile S12 is aggregation (data group) of data including all the information necessary in duplicating processing similar to executed authentication processing afterward. This includes, at least, the input biometric information S1 used in the authentication processing, registered biometric information S2, program code for the collation processing executed in the collation unit 13, and, assuming that it has been previously registered in another external database, the identifier, operation environment and execution parameters at the time of the execution (refer to explanation to be described later).

The service provider device 20 is configured by, for example, a computer device (including CPU, memory, various input and output devices) having a communication means such as a server device used by the service provider which provides a service to the user, and, functionally, has a service provision possibility determination unit 21.

The service provision possibility determination unit 21 is realized when the CPU of the computer device configuring the service provider device 20 executes a program code of software for service provision possibility determination which has been preset. The service provision possibility determination unit 21 inputs the collation result output S11 from the user terminal 10, and an output S14 of a confirmation/replication verification unit 31 provided from the authentication verification device 30 according to need, and determines the possibility of service provision to the user which performs the biometric information input.

The authentication verification device 30 is configured by, for example, a computer device (including CPU, memory, various input and output devices) having a communication means such as a server device, and, functionally, includes a profile writing unit 32 that receives the profile S12 output from the profile generation unit 14 of the user terminal 10, and writes the profile S12 to a profile storage unit 33, profile storage unit 33 that stored the written profile S12, and confirmation/replication verification unit 31 as a verification means that verifies collation processing contents performed by the user terminal 10 by executing the collation processing using the stored profile S12. Of these, the profile writing unit 32 and profile storage unit 33 configure a data storage means of the present invention.

The confirmation/replication verification unit 31 is realized when the CPU of the computer device configuring the authentication verification device 30 executes a program code of software for confirmation/replication verification which has been preset.

The confirmation/replication verification unit 31 has a processing environment in which processing similar to that of the collation unit 13 by the user terminal is possible, and, when receiving a verification request S13 from the service provider device 20, reads out the profile S12 corresponding to an identifier for the authentication processing included therein from the profile storage unit 33, and confirms the validity of respective data in the read out profile S12. Furthermore, according to need, using the input biometric information and registered biometric information used in the authentication processing, program code for the collation processing executed in the collation unit 13, and, assuming that it has been previously registered in another external database, the identifier, and operation environment and execution parameters at the time of the execution, the confirmation/replication verification unit 31 duplicates and replicates the authentication processing executed before, and outputs the verification result as a signal S14.

The entire operation in this exemplary embodiment will be explained in detail with reference to FIGS. 1 to 9.

Figure 2:
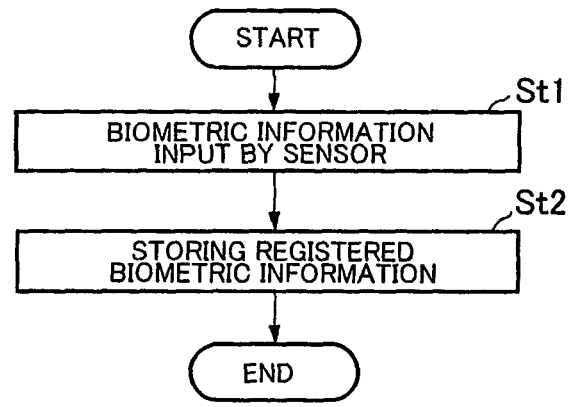
FIG. 2 shows a flowchart indicative of the processing of a user terminal side at the time of registering biometric information.

FIG. 2 shows a flowchart indicative of the processing of the user terminal 10 side at the time of registering biometric information. An operation program corresponding to the flowchart is set up in a memory, not shown, of a computer device configuring the user terminal 10, and can be executed by the CPU.

Firstly, on the user terminal 10 side, as the processing operation at the time of registering biometric information, by the user utilizing a service of the service provider, as shown in FIG. 2, through the sensor 11 of the user terminal 10 which is owned and held by the user, biometric information of the user who should be the qualified user is input to the inside of the user terminal 10 (step St1). The biometric information thus input is stored in the registered biometric information database 12 (step St2) as the registered biometric information S2 of an internal format which has been previously determined in the user terminal 10. On the other hand, the user concludes a service contract with the service provider, and registers that the user terminal 10 is used as a terminal to prove that the user is the identical person at the time of requesting a service.

Figure 3:
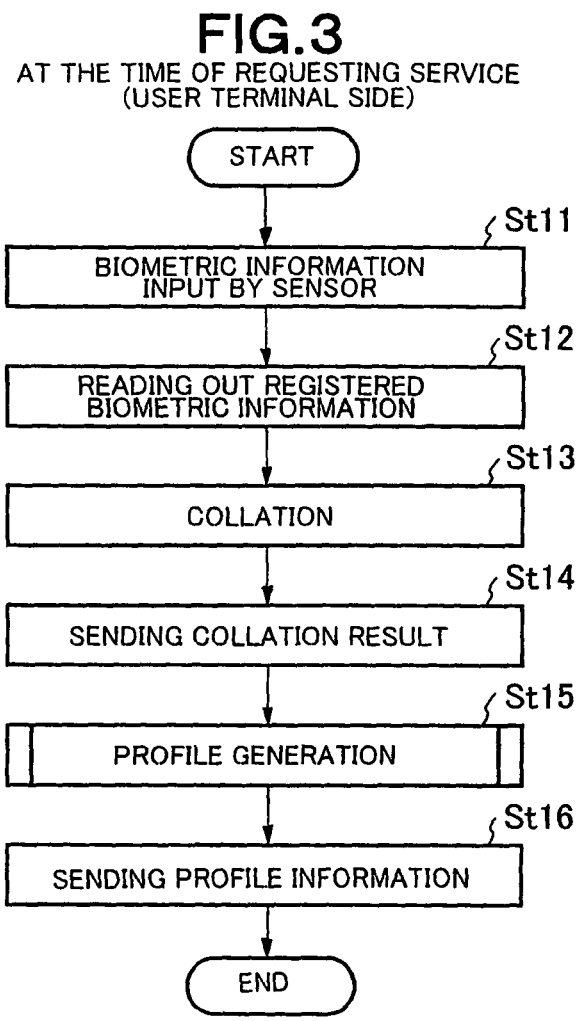
FIG. 3 shows a flowchart indicative of the processing of the user terminal side at the time of requesting a service.

FIG. 3 shows a flowchart indicative of the processing on the user terminal 10 side at the time of requesting a service. An operation program corresponding to the flowchart is set in a memory, not shown, of a computer device configuring the user terminal 10, and can be executed by the CPU.

On the user terminal 10 side, when a user utilizes a service, as shown in FIG. 3, when biometric information of the user is input from the sensor 11 by the user (step St11), the collation unit 13 reads out the registered biometric information S2 stored in the registered biometric information database 12 (step St12), and evaluates whether the degree of similarity between the input biometric information S1 and the registered biometric information S2 is equal to a threshold value or more (accord) or not (disaccord) (step St13), and sends the collation result (accord or disaccord) S11 to the service provider device 20 (step St14).

Figure 4:
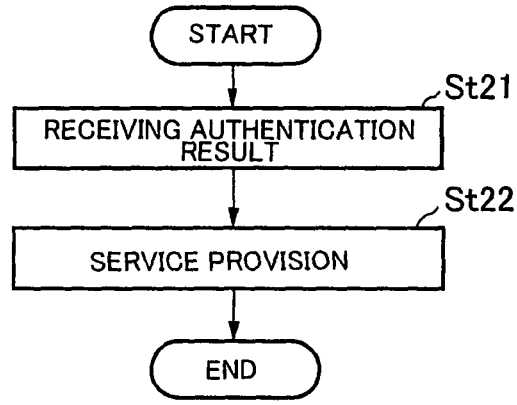
FIG. 4 shows a flowchart indicative of the processing of a service provider device side at the time of requesting a service.

FIG. 4 shows a flowchart indicative of the processing on the service provider device 20 side at the time of requesting a service. An operation program corresponding to the flowchart is set up in a memory, not shown, of a computer device configuring the service provider device 20, and can be executed by the CPU.

The service provider device 20 receives the signal S11 in the service provision possibility determination unit 21 (step St21), and, in case of accord, determines that the request user is the qualified user, and provides a service in accordance with the request (step St22).

However, only in this processing, the service provider side which determines the possibility of service provision utilizing the authentication result using the biometric information in the user terminal 10 can know only whether or not the collation result is accord, and cannot verify the validity of the result. In order to compensate this, when the authentication operation is performed and the service provider admits that the validity is necessary, storage operation for profile is performed in the following manner.

That is, returning to FIG. 3, when profile generation is designated using a signal S15 from the service provider device 20, the user terminal 10 generates the profile S12 from the profile generation unit 14 (step St15). That is, as necessary information to duplicate processing similar to executed authentication processing afterward, the profile generation unit 14 aggregates data including the input biometric information S1 used in the authentication processing, registered biometric information S2, program code for the collation processing executed in the collation unit 13, and, assuming that it has been previously registered in another external database, the identifier, operation environment and execution parameters at the time of the execution, in a data set to generate the profile S12. Then, thus generated profile S12 is sent to the authentication verification device 30 (step St16).

FIG. 5 shows a specific example of the profile S12 generated in the profile generation unit 14. In the example shown in FIG. 5, in the profile S12, a processing execution terminal ID (example: 153-682-2451565), an identification processing ID (example: 324654), an execution time stamp (example: 16:34:32, 07/26/2005), a processing program management organization ID (example: 231), a registered feature extraction processing ID (example: 8269), an input feature extraction processing 113 (example: 8269), a feature collation processing ID (example: 8288), a feature collation processing execution threshold value (example: 1200), other execution parameters, a registered biometric information size [byte] (example: 180000), an input biometric information size [byte] (example: 90000), registered biometric information (real data), and input biometric information (real data) are included.

FIG. 6 shows a flowchart indicative of the details of the profile generation (FIG. 3: step St15) by the profile generation unit 14. An operation program corresponding to the flowchart is set up in a memory, not shown, of a computer device configuring the user terminal 10, and can be executed by the CPU.

In FIG. 6, firstly, the authentication processing (collation processing and determination processing) is executed in the collation unit 13 (step St151). Next, profile generation is designated using the signal S15 from the service provider device 20, and whether the profile storage is necessary or not is determined (step St152), and in case the profile storage is necessary, the profile generation unit 14 reads out the various processing ID used in the authentication processing, processing program management organization ID, execution parameter such as an execution threshold value, registered biometric information and input biometric information (step St153 to step St155), and determines other values necessary for the profile S12 (step St156). Then, the profile generation unit 14 mounts these respective items in the profile S12 (step St157), and performs the electronic signature and encryption (step St158), and completes the profile S12 to send it to the authentication verification device 30 (step St159).

Figure 7:
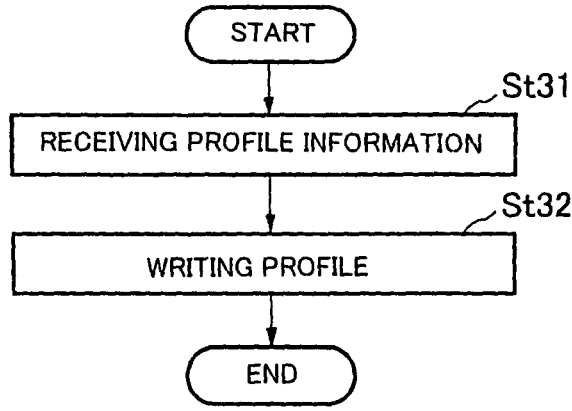
FIG. 7 shows a flowchart indicative of the processing of an authentication verification device side at the time of requesting a service.

FIG. 7 shows a flowchart indicative of the processing on the authentication verification device 30 side at the time of requesting a service. An operation program corresponding to the flowchart is set up in a memory, not shown, of a computer device configuring the authentication verification device 30, and can be executed by the CPU.

When receiving the profile information output as the signal S12 (step St31), the authentication verification device 30 sends it to the profile writing unit 32, and the profile writing unit 32 writes and stores the profile information in the profile storage unit 33 with an identifier which identifies the authentication processing (step St32).

In this way, the service provider designates the profile generation and storage in case the user connects a new terminal to the system or in case of changing the setup of the internal operation parameter, or in case a new user utilizes, or in case a service required with the authentication is more important, and it is determined that the possibility that the verification becomes necessary later is high. This is the case when expensive value such as requesting transfer of high value is dealt.

The above-described explanation is the operation when the user requests a service with respect to the service provider, and performs the necessary authentication operation using a user terminal. On the other hand, in case there is raised a necessity of verifying the validity of a service provision, and accordingly the service provider verifies the authentication processing in the user terminal, the following operation will be performed as shown in FIG. 8 to FIG. 10.

Figure 8:
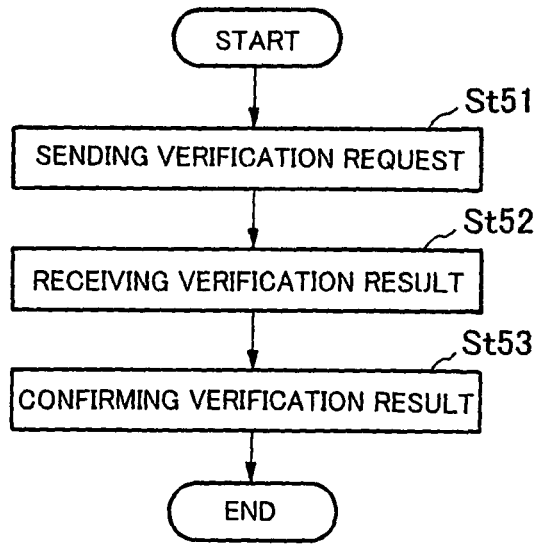
FIG. 8 shows a flowchart indicative of the processing of the service provider device side at the time of the verification.

FIG. 8 shows a flowchart indicative of the processing on the service provider device 20 side at the time of the verification. An operation program corresponding to the flowchart is set in a memory, not shown, of a computer device configuring the service provider device 20, and can be executed by the CPU.

Firstly, the service provider device 20 sends the verification request S13 to the authentication verification device 30 with an identifier of the authentication processing to be verified (step St51).

Figure 9:
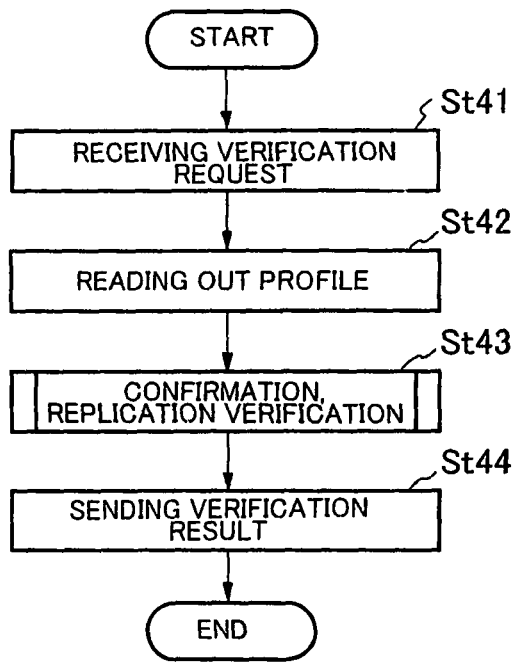
FIG. 9 shows a flowchart indicative of the processing of the authentication verification device side at the time of the verification.
Figure 10:
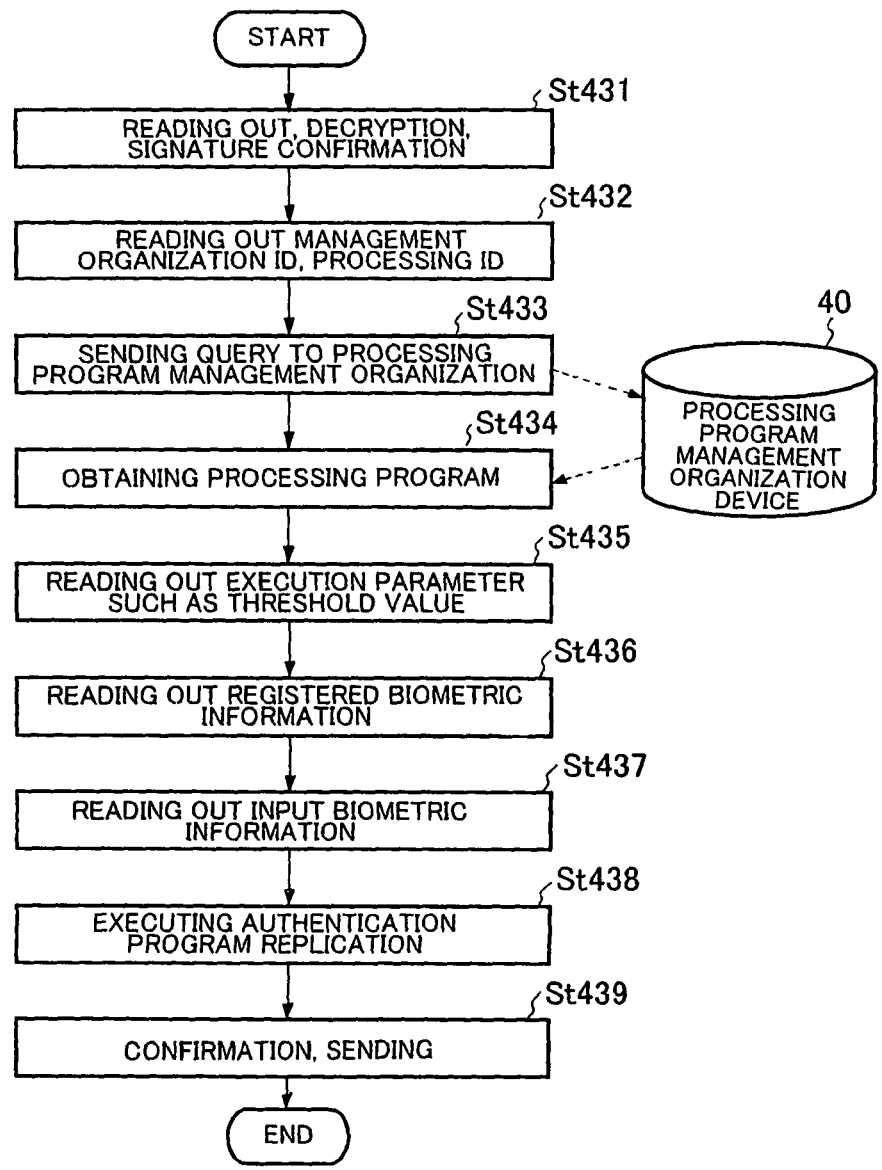
FIG. 10 shows a flowchart indicative of the details of the verification processing.

FIG. 9 shows a flowchart indicative of the processing on the authentication verification device 30 side at the time of the verification. An operation program corresponding to the flowchart is set up in a memory, not shown, of a computer device configuring the authentication verification device 30, and can be executed by the CPU.

When the authentication verification device 30 receives the verification request S13 (step St41), the confirmation/replication verification unit 31 reads out a profile corresponding to an identifier of the authentication processing included therein from the profile storage unit 33 (step St42). Next, the confirmation/replication verification unit 31 confirms the validity of respective data in the read out profile, and, according to need, using the input biometric information S1 used in the authentication processing, registered biometric information S2, program code for the collation processing executed in the collation unit 13, and, assuming that it has been previously registered in another external database, the identifier, operation environment and execution parameters at the time of the execution, duplicate and replicate the authentication processing executed before (step St43).

FIG. 10 shows a flowchart indicative of the details of the verification processing (step St43) by the confirmation/replication verification unit 31. An operation program corresponding to the flowchart is set up in a memory, not shown, of a computer device configuring the service provider device 20, and can be executed by the CPU.

In FIG. 10, when receiving the profile S12, the confirmation/replication verification unit 31 decrypts the profile S12, and confirms the electronic signature (step St431) After the confirmation, the confirmation/replication verification unit 31 reads out the processing program management organization ID, processing ID from the decrypted profile S12 (step St432), and sends a query to the processing program management organization device 40 based on these (step St433), and obtains a processing program which is sent from the processing program management organization device 40 responsively (step St434). Furthermore, the confirmation/replication verification unit 31 reads out an execution parameter such as an execution threshold value, registered biometric information, and input biometric information from the profile S12 (step St435 to step St437), and executes the replication of the authentication program using these and an obtained processing program (step St438).

In this way, by comparing the result of executed collation processing and the result of the biometric information collation in the terminal, and confirming whether they accord with each other, the authentication verification device 30 confirms that the processing operation of the user terminal 10 is desired and is not changed, and outputs the verification result as a signal S14 (FIG. 10: step St439, FIG. 9: step St43).

As a result, when receiving the verification result S14 (FIG. 8: step St52), utilizing this, the service provider device 20 can confirm and verify the validity of a service provision (determining possibility of service provision) (FIG. 8: step St53), or it becomes possible to prove the validity with respect to other related parties.

In this way, according to the exemplary embodiment, there are provided the profile generation unit 14 as means to aggregate the input biometric information, registered biometric information, and information to duplicate collation processing contents when the authentication processing is executed in the user terminal 10, profile writing unit 32 and profile storage unit 33 as means to store this at the outside of the user terminal with identification information of the authentication processing, and confirmation/replication verification unit 31 as means to confirm the contents and replicate the collation processing, and the operation is performed so that the validity of the authentication processing is verified when the verification is necessary. By employing the configuration, when verification is necessary, the service provider can be notified of the verification by verifying the validity of the authentication processing.

That is, according to this exemplary embodiment, since all the information such as two input data, program, operation parameters, which determines the result of the authentication processing in the user terminal 10, are aggregated to be stored in the profile storage unit 33 as a profile, and they can be read out to be confirmed and replicated when they are necessary, it becomes possible to verify the validity of the authentication processing performed in the user terminal when the validity is necessary for the service provider side.

Furthermore, when configuring a service system by using this, there may be employed a configuration in which, a user terminal which does not have technical details for mounting and sufficient information with respect to the authentication accuracy realized by its authentication unit can be connected to be used in advance, and, accordingly, user terminals provided by a wide variety of venders can be connected to the system to be utilized, which can remove a restriction on the user spread, making it possible to promote diffusing a service.

Second Exemplary Embodiment

Next, the second exemplary embodiment of the present invention will be explained referring to the accompanying drawings. In the second exemplary embodiment, parts or components similar to those in the first exemplary embodiment are indicated with the same reference numerals, and detailed explanation of which will be omitted or simplified.

Figure 11:
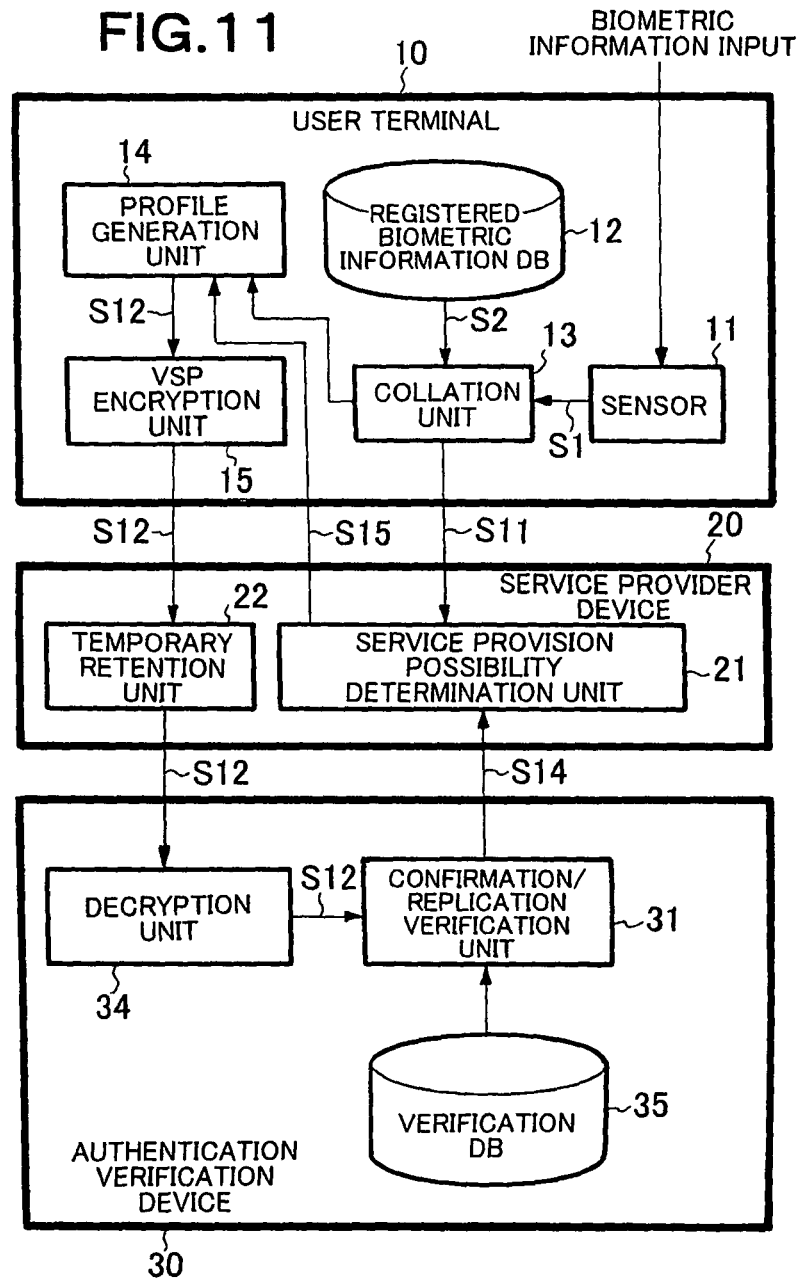
FIG. 11 shows a block diagram indicative of the entire configuration of the user authentication system of the second exemplary embodiment according to the present invention.

FIG. 11 shows a block diagram indicative of the configuration of the exemplary embodiment. Referring to FIG. 11, the user authentication system in this exemplary embodiment includes the user terminal 10, service provider device 20, and authentication verification device 30, which are similar to those in the first exemplary embodiment. Points of difference from the first exemplary embodiment are as follows.

1) The user terminal 10 side includes a VSP (Verisign Security Procedures) encryption unit 15. The encryption unit 15 encrypts an output message of the profile S12 generated by the profile generation unit 14 using a public key of the authentication verification device 30.

2) The service provider device 20 side includes a temporary retention unit 22. The temporary retention unit 22 stores and preserves the output message of the encrypted profile S12 sent from the user terminal 10, and sends it to the authentication verification device 30 according to need.

3) The authentication verification device 30 side includes, instead of the above-described profile writing unit and profile storage unit, a decryption unit 34 and a verification database (DB) 35. The decryption unit 34 decrypts encrypted profile information S12 output from the temporary retention unit 22 of the service provider device 20 using its secret key. For example, the verification database 35 retains registered information related to the duplication and operation accuracy of a collation processing program for plural user terminals, and the confirmation/replication verification unit 31 can refer to and utilize the information at the time of the operation.

Other components are similar to those in the first exemplary embodiment.

Next, the entire operation of the exemplary embodiment will be explained with reference to FIG. 11 to FIG. 15. The explanation of the operations similar to those in the first exemplary embodiment will be omitted or simplified.

The processing of the user terminal 10 side at the time of registering biometric information is performed as shown in the above-described FIG. 2.

Figure 12:
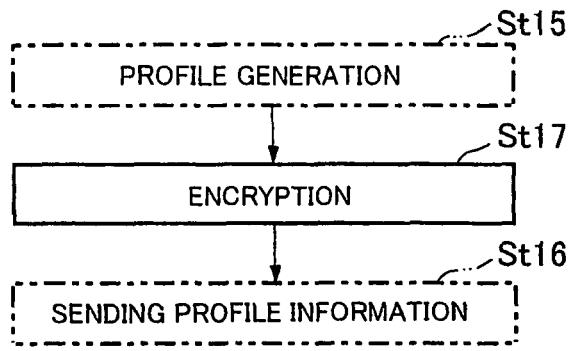
FIG. 12 shows a flowchart indicative of the processing of the user terminal side at the time of requesting a service.

FIG. 12 shows a flowchart indicative of the processing on the user terminal 10 side at the time of requesting a service. Point of difference from the above-described FIG. 3 is that, between the profile generation (step St15) and the sending profile information (step St16), encryption processing (step St17) is inserted. The encryption processing is performed in the VSP encryption unit 15. That is when the profile S12 is generated in the above-described same operation, the VSP encryption unit 15 encrypts the profile S12 using a public key of the authentication verification device 30. The encryption is performed so as to prevent biometric information being personal information of the user from being unnecessarily disclosed to the service provider, and prevents the service provider from utilizing the biometric information for other purposes. The message of the encrypted profile S12 is output to the service provider device 20.

Figure 13:
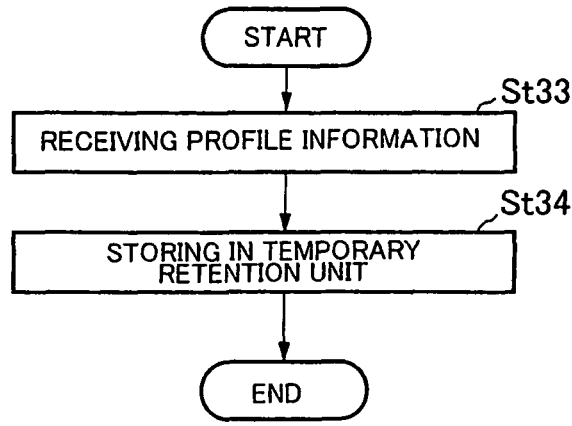
FIG. 13 shows a flowchart indicative of the processing of the service provider device side at the time of requesting a service.

FIG. 13 shows a flowchart indicative of the processing on the service provider device 20 side at the time of requesting a service. In FIG. 13, when receiving the encrypted profile S12 (step St33), the service provider device 20 stores the encrypted profile S12 in the temporary retention unit 22 with an identifier which identifies the authentication processing (step St34).

Figure 14:
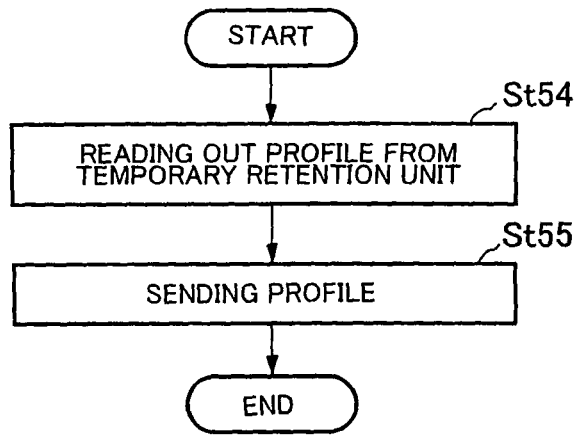
FIG. 14 shows a flowchart indicative of the processing of the service provider device side at the time of the verification.

FIG. 14 shows a flowchart indicative of the processing on the service provider device 20 side at the time of the verification. In FIG. 14, from a profile information group stored in the temporary retention unit 22, the service provider device 20 reads out a profile corresponding to an identifier of the authentication processing using an identifier of the authentication processing to be verified (step St54), and sends it to the authentication verification device 30 (step St55).

Figure 15:
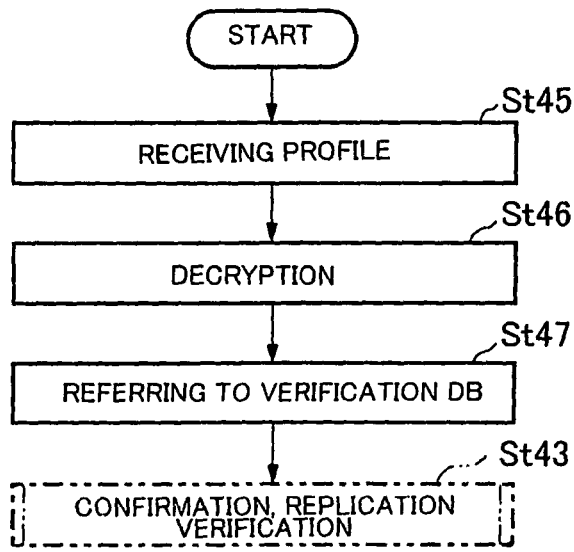
FIG. 15 shows a flowchart indicative of the processing of the authentication verification device side at the time of the verification.

FIG. 15 shows a flowchart indicative of the processing on the authentication verification device 30 side at the time of the verification. In FIG. 15, when receiving the sent profile S12 (step St45), the authentication verification device 30 decrypts the message using a secret key of the authentication verification device 30 itself in the decryption unit 34 (step St46). Next, the confirmation/replication verification unit 31 receives decrypted profile information, and, referring to the verification database 35 (step St47), executes the above-described same confirmation and replication verification processing (step St43).

In this way, according to the exemplary embodiment, in addition to the effect similar to that in the above-described first exemplary embodiment, by employing the encryption which can be decrypted only by the authentication verification device, the verification operation can be realized while preventing biometric information being personal information of the user from being unnecessarily disclosed to the service provider. Furthermore, since it is not necessary to store profile information in the authentication verification device, the authentication verification device can be realized with a comparatively low cost, while, by employing a method that the service provider device stores only data of authentication related to an expensive deal which will be high in verification necessity in the future, the realization cost of the entire system can be lowered.

Third Exemplary Embodiment

Next, the third exemplary embodiment of the present invention will be explained referring to the accompanying drawings. In the third exemplary embodiment, parts or components similar to those in the first and second exemplary embodiments are indicated with the same reference numerals, and detailed explanation of which will be omitted or simplified.

Figure 16:
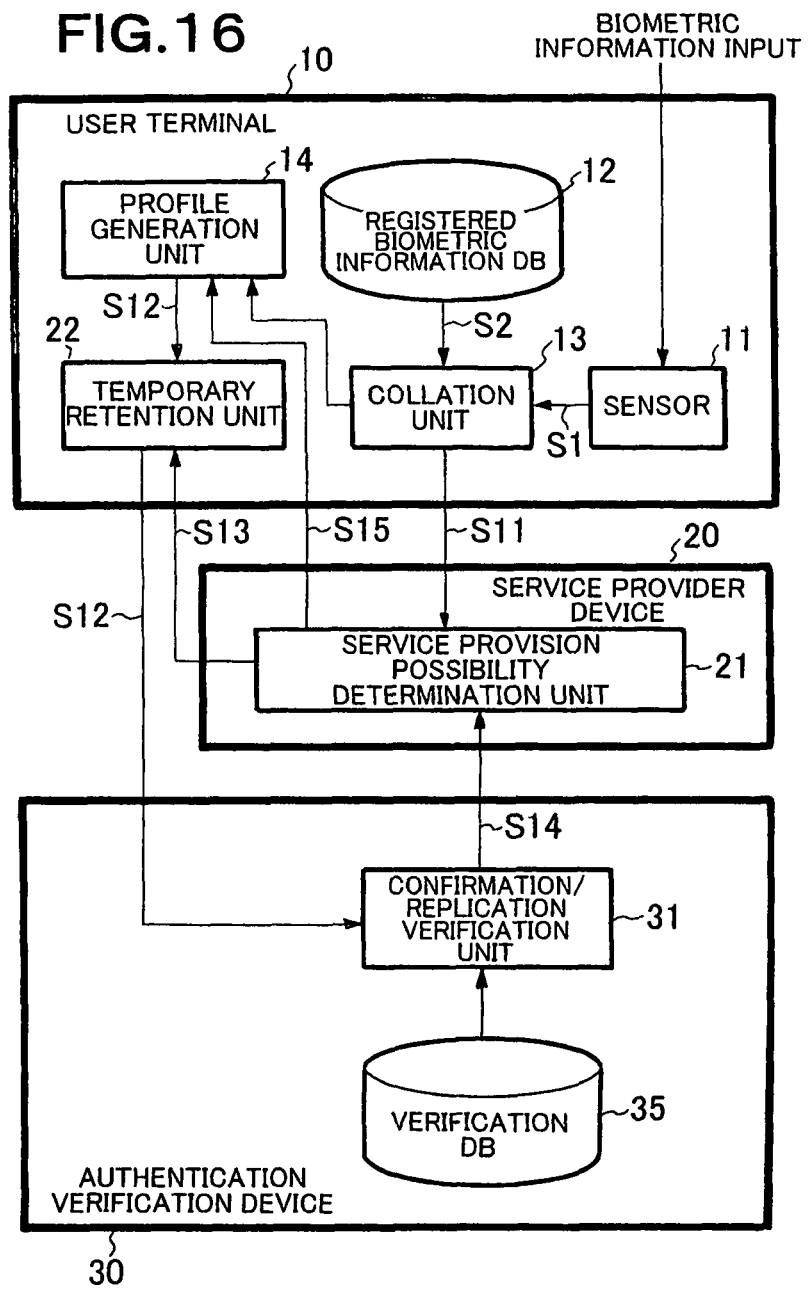
FIG. 16 shows a block diagram indicative of the entire configuration of the user authentication system of the third exemplary embodiment according to the present invention.
Figure 17:
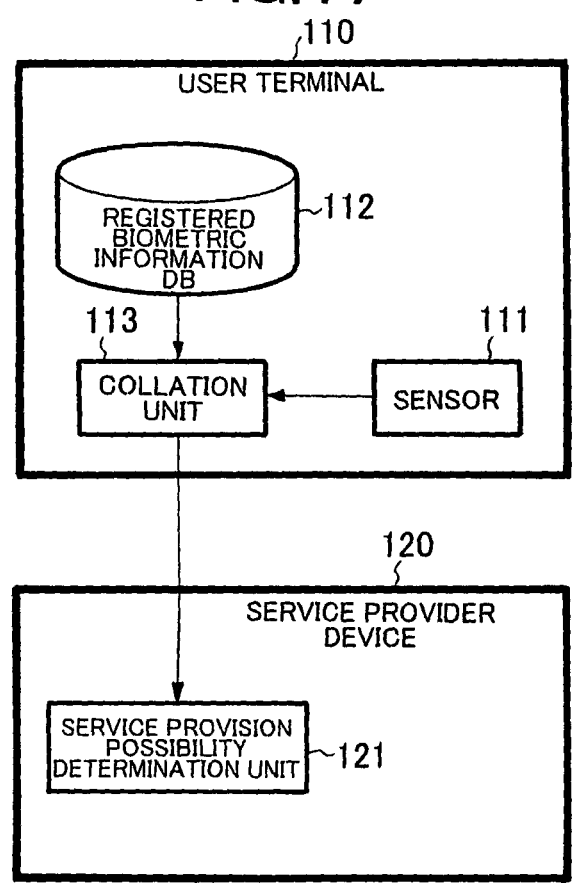
FIG. 17 shows a block diagram indicative of the system configuration of the conventional technique.

FIG. 16 shows a block diagram indicative of the configuration of the exemplary embodiment. Referring to FIG. 16, the user authentication system in this exemplary embodiment includes the user terminal 10, service provider device 20, and authentication verification device 30, which are similar to those in the first exemplary embodiment. Points of difference from the first exemplary embodiment are as follows.

1) The user terminal 10 side includes the temporary retention unit 22. The temporary retention unit 22 stores and preserves the output message of the encrypted profile S12 sent from the user terminal 10, and sends it to the authentication verification device 30 according to need. In the second exemplary embodiment, the temporary retention unit 22 is mounted on the service provider device 20 side. On the other hand, in this exemplary embodiment, the temporary retention unit 22 is mounted at the user terminal 10 side. Furthermore, the VSP encryption unit 15 in the second exemplary embodiment is not arranged.

2) The authentication verification device 30 side includes, instead of the above-described profile writing unit and profile storage unit, a verification database 35. Similar to the second exemplary embodiment, the verification database 35 retains registered information related to the duplication and operation accuracy of a collation processing program for plural user terminals, and the confirmation/replication verification unit 31 can refer to and utilize the information at the time of the operation.

Other components are similar to those in the first exemplary embodiment.

Next, the entire operation of the exemplary embodiment will be explained. The explanation of the operations similar to those in the first exemplary embodiment will be omitted or simplified.

Firstly, at the time of requesting a service, the user terminal 10 stores the profile S12 which is generated in the above-described same manner in the temporary retention unit 22 with an identifier which identifies the above-described authentication processing. At this time, so as to prevent data for detection from being changed, the user terminal 10 takes a general measure to prevent the change such as adding an electronic signature with a time stamp (execution time information) etc.

Next, at the time of the verification, when receiving the verification request S13 from the service provider device 20, from a profile information group stored in the temporary retention unit 22, the user terminal 10 reads out the profile S12 corresponding to an identifier of the authentication processing using an identifier of the authentication processing to be verified, and sends it to the authentication verification device 30. Hereinafter, as described above, referring to the verification database 35 based on the profile S12, the confirmation and replication verification processing by the confirmation/replication verification unit 31 is executed.

In this way, according to the exemplary embodiment, in addition to the effect similar to that in the above-described first exemplary embodiment, since it is not necessary to store profile information in the authentication verification device and service provider device, there is brought about an advantage that they can be realized with a comparatively low cost.

On the other hand, as is not apparently written in the above-described explanation, in general, in sending and receiving messages, it is desired to take measures on security such as performing the mutual authentication to confirm the other party, encrypting a message to keep the contents secret, and adding an electronic signature, etc.

While the invention has been described in accordance with certain preferred exemplary embodiments, it should be understood by those ordinarily skilled in the art that the invention is not limited to the exemplary embodiments, but various modifications, alternative constructions can be implemented without departing from the scope and spirit of the present invention based on the contents of the claims. These modifications, alternative constructions belong to the range of right of the present invention.

For example, in case of realizing at least part of functions of respective units configuring the user authentication system of above-described respective exemplary embodiments by a CPU using a program code, the program code and a recording medium which records it are included in the range of the present invention. The program code in this case includes, in case the above-described function is realized in cooperation with an operating system, other application software, etc., their program codes. Furthermore, as a recording medium, any of a semiconductor memory such as a ROM (Read Only Memory), a disc-shaped recording medium (optical disk, magnet-optical disk, magnetic disk, etc.), a tape-shaped recording medium (magnetic tape, etc.), a card-shaped recording medium (memory card, etc.), etc. can be employed. Furthermore, as the program code, a configuration which is downloaded from a computer device such as a server through a network can be employed.

INDUSTRIAL APPLICABILITY

The present invention can be applied to performing the electronic commerce by a financial service or an electronic mall employing the Internet connection using a device owned and operated by the user such as a cellular phone or a personal computer as a terminal.

The invention claimed is:

1. A user-authentication verification system comprising:
a terminal which inputs biometric information to request a service provision with respect to a service provider device and performs biometric information collation between the input biometric information and registered biometric information, which has been previously registered, and transmits a collation result to the service provider device;
a data aggregation unit for aggregating, as information to verify the collation result of the biometric information collation performed in the terminal, the input biometric information, the registered biometric information, and information which can duplicate a plurality of collation processing contents, as an aggregation of data;
a data storage unit for storing the aggregation of data; and
wherein the aggregation of data comprises a data group,
wherein the data group comprises:
collation data of the input biometric information used in a processing of the biometric information collation;
collation data of the registered biometric information used in the processing of the biometric information collation;
an identifier which specifies a code of a collation processing program used in the processing of the biometric information collation or the collation processing program, and
information to duplicate an execution environment of the processing of the biometric information collation processing;
wherein the data storage unit stores the data group; and
wherein the verification unit reads out the data group stored in the data storage unit and duplicates the processing of the biometric information collation to confirm a result;
a verification unit for verifying the collation result of file terminal by executing and duplicating the biometric information collation performed in the terminal using the aggregation of data in a device different from the terminal,
wherein the verification unit compares a result of the collation executed by the verification unit and the collation result performed in the terminal to verify the collation result performed in the terminal, and transmits a result of the verification to the service provider device.

2. The user authentication system according to claim 1, further comprising:
an encryption unit for encrypting the aggregation of data such that the encrypted aggregation of data can be decrypted only in a device in which the verification of the collation result of the terminal is performed.

3. The user authentication system according to claim 1, wherein the data aggregation unit is arranged in the terminal,
wherein the verification unit is arranged in an authentication verification device, which is communicably connected to the terminal, and
wherein the data storage unit is arranged in the authentication verification device.

4. The user authentication system according to claim 1, wherein the data aggregation unit is arranged in the terminal,
wherein the verification unit is arranged in an authentication verification device, which is communicably connected to the terminal, and
wherein the data storage unit is arranged in the service provider device.

5. The user authentication system according to claim 1, wherein the data aggregation unit is arranged in the terminal,
wherein the verification unit is arranged in an authentication verification device, which is communicably connected to the terminal, and
wherein the data storage unit is arranged in the terminal.

6. The user authentication system according to claim 1, wherein the service provider device includes a device that determines a possibility of the service provision to the terminal, based on the verification result of the verification unit.

7. A terminal which inputs biometric information to request a service provision with respect to a service provider device and performs a biometric information collation between the input biometric information and a registered biometric information which has been previously registered, and transmits a collation result to the service provider device, the terminal comprising:
- a data aggregation unit for aggregating, as information to verify the collation result of the biometric information collation performed in the terminal, the input biometric information, the registered biometric information, and information which can duplicate a plurality of collation processing contents, as an aggregation of data,
- wherein aggregation of data comprises a data group, wherein the data group comprises:
- collation data of the input biometric information used in a processing of the biometric information collation; and
- collation data of the registered biometric information used in the processing of the biometric information collation;
- an identifier which specifies a code of a collation processing program used in the processing of the biometric information collation or the collation processing program; and
- information to duplicate an execution environment of the processing of the biometric information collation;
  - wherein the aggregation of data is used for verification in a verification unit, which verifies the collation result of the terminal by executing and duplicating the biometric information collation performed in the Iterminal using the aggregation of data in a device different from the terminal, and
- wherein, the verification unit compares a result of the collation executed by the, verification unit and the collation result performed in the terminal to verify the collation result performed in the terminal and transmit a result of the verification to the service provider device.

8. The terminal according to claim 7, wherein the terminal stores the data group.

9. The terminal according to claim 7, wherein the terminal transmits the data group to an external device.

10. An authentication verification device that is communicably connected to a terminal, which inputs biometric information to request a service provision with respect to a service provider device and performs a biometric information collation between the input biometric information and registered biometric information, which has been previously registered, and transmits a collation result to the service provider device, the authentication verification device comprising:
- a reception unit for receiving an aggregation of data, which is configured by aggregating, as information to verify the collation result of the biometric information collation performed in the terminal, the input biometric information, the registered biometric information, and information which can duplicate a plurality of collation processing contents; and
- wherein the reception unit receives a data group comprising:
- collation data of the input biometric information used in the processing of the biometric information collation; and,
- collation data of the registered biometric information used in the processing of the biometric information collation;
- an identifier which specifies a code of a collation processing program used in the processing of the biometric information collation or the collation processing program; and
- information to duplicate an, execution environment of the processing of the biometric information collation, and
- wherein the verification unit executes and duplicates the processing of the biometric information collation using the data group to confirm a result;
- a verification unit for verifying the collation result of the terminal by executing and duplicating a processing of the biometric information collation using the aggregation of data,
- wherein the verification unit compares a result of the collation executed by the verification unit and the collation result performed in the terminal to verify the collation result performed in the terminal and transmits a result of the verification to the service provider device.

11. A user authentication method which is used in a system including a terminal which inputs biometric information to request a service provision with respect, to a service provider device and performs a biometric information collation between the input biometric information and registered biometric information, which has been previously registered, and transmits a collation result to the service provider device, the user authentication method comprising:
- aggregating, as information to verify the collation result of the biometric information collation performed in the terminal, the input biometric information, the registered biometric information, and information which can duplicate a plurality of collation processing contents, as an aggregation of data;
- storing the aggregation of data;
- wherein said aggregation of data comprises a data group, wherein the data group comprises:
- collation data of the input biometric information used in the processing of the biometric information collation;
- collation data of the registered biometric information used in the processing of the biometric information collation;
- an identifier which specifies a code of a collation processing program used in the processing of the biometric information collation or the collation processing program; and
- information to duplicate an execution environment of the collation,
- wherein the data storage unit stores the data group, and
- wherein the verification unit reads out the stored data group and duplicates the processing of the biometric information collation to confirm a result;
- verifying the collation result of the terminal by executing and duplicating a processing of the biometric information collation using the aggregation of data in a device different from the terminal and by comparing a result of the executed collation and the collation result performed in the terminal; and
- transmitting a result of the verification to the service provider device.

12. A non-transitory tangible computer-readable medium embodying a program, of machine-readable instructions executable by a digital processing apparatus to perform an instruction control method, wherein the program is used in a system including a terminal, which inputs barometric information to request a service provision with respect to a service provider device and performs a biometric information collation between the input biometric information and a registered barometries information, which has been previously registered, and transmits a collation result to the service provider device, the instruction control method comprising:
- aggregating, as information to verify the collation result of the biometric information collation performed in the terminal, the input biometric information, the registered biometric information, and information which can duplicate a plurality of collation processing contents, as an aggregation of data;

storing the aggregation of data; and a data group comprising:

collation data of the input biometric information used in the processing of the biometric information collation; and collation data of the registered biometric information used in the processing of the biometric information collation;

an identifier which specifies a code of a collation processing program used in the processing of the biometric information collation or the collation processing program; and information to duplicate an execution environment of the processing of the biometric information collation, wherein the storing of aggregation data includes storing the data and wherein the verifying of the collation result of the terminal by executing and duplicating a processing of the biometric information collation using the aggregation of data in a device different from the terminal includes reading out the stored data group and duplicating the processing of the biometric information collation to confirm a result;

verifying the collation result of the terminal by executing and duplicating a processing of the biometric information collation using the aggregation of data in a device different from the terminal, and by comparing a result of the executed collation and the collation result performed in the terminal; and transmitting a result of the verification to the service provider device.

* * * * *